United States Patent
Martino (12) 
(10) Patent No.: US 7,886,802 B2
(45) Date of Patent: Feb. 15, 2011

(54) THERMODE SEALING WITH MAGNETIC FIELD COMPENSATION

(75) Inventor: Peter M. Martino, Windham, NH (US)

(73) Assignee: Maxtor Corporation, Scotts Valley, CA (US)

( * ) Notice: Subject to any disclaimer, the term of this patent is extended or adjusted under 35 U.S.C. 154(b) by 951 days.

(21) Appl. No.: 11/787,136

(22) Filed: Apr. 13, 2007

(65) Prior Publication Data

US 2007/0240820 A1    Oct. 18, 2007

Related U.S. Application Data (60) Provisional application No. 60/744,921, filed on Apr. 14, 2006.

(51) Int. Cl.
*B32B 37/00* (2006.01)

(52) U.S. Cl. .......... 156/583.1; 156/580; 156/380.6; 156/379.6; 156/272.2

(58) Field of Classification Search ........... 156/580, 156/583.1, 583.2, 583.6, 583.7, 379.6, 380.6, 156/272.2, 275.5, 285; 219/200, 243, 245, 219/246, 247
See application file for complete search history.

(56) References Cited

U.S. PATENT DOCUMENTS

| | | | |
|---|---|---|---|
| 3,923,590 A * | 12/1975 | Humphries | ............... 156/580 |
| 4,571,472 A * | 2/1986 | Pollack et al. | ............... 219/604 |
| 4,736,882 A | 4/1988 | Winter et al. | |
| 5,454,157 A | 10/1995 | Ananth et al. | |
| 6,392,838 B1 | 5/2002 | Hearn et al. | |
| 6,430,000 B1 | 8/2002 | Rent | |
| 6,556,372 B2 | 4/2003 | Hearn et al. | |
| 7,016,145 B2 | 3/2006 | Gunderson et al. | |
| 7,119,984 B2 | 10/2006 | Macleod et al. | |
| 2002/0003137 A1 * | 1/2002 | Yokoyama et al. | ............... 219/243 |
| 2003/0179489 A1 | 9/2003 | Bernett et al. | |

FOREIGN PATENT DOCUMENTS

| DE | 3803515 A1 * | 8/1988 |
|---|---|---|
| JP | 408161881 A | 6/1996 |

\* cited by examiner

*Primary Examiner*—Richard Crispino
*Assistant Examiner*—Daniel McNally
(74) *Attorney, Agent, or Firm*—Fellers, Snider, et al.

(57) ABSTRACT

Apparatus and method for applying thermal energy to a sealing member. Electrical current is applied to a heating assembly to generate thermal energy, and a heat conductor transfers the generated thermal energy to a seal member adjacent a housing. The heating assembly is configured to substantially prevent a magnetic field generated by the applied electrical current from extending to the housing.

20 Claims, 7 Drawing Sheets

THERMODE SEALING WITH MAGNETIC FIELD COMPENSATION

RELATED APPLICATIONS

The present application makes a claim of domestic priority to U.S. Provisional Patent Application No. 60/744,921 filed Apr. 14, 2006.

BACKGROUND

Seal members are used in a variety of applications, such as to seal an opening in a device housing. A thermally attachable seal member often has a substrate layer, such as a thin metal disc, and a thermal adhesive on an attaching side of the substrate layer. The seal member is securable to a device by heating the member to a temperature sufficient to cause the adhesive to melt and adhere to the device.

Mechanisms such as thermodes can be used to heat and affix such seal members. Thermodes, electrically heated elements that have found wide use for soldering, utilize relatively large electrical currents to generate heat, which can create intense and extensive magnetic fields. Such magnetic fields can adversely affect storage media disposed in a housing, as well as other magnetically sensitive components and materials.

SUMMARY OF INVENTION

Embodiments of the present invention are generally directed to an apparatus and method for applying thermal energy to a sealing member.

In accordance with various embodiments, electrical current is applied to a heating assembly to generate thermal energy, and a heat conductor transfers the generated thermal energy to a seal member to form a seal between the seal and housing. The heating assembly is configured to substantially prevent a magnetic field generated by the applied electrical current from extending to the housing.

DETAILED DESCRIPTION

Figure 1:
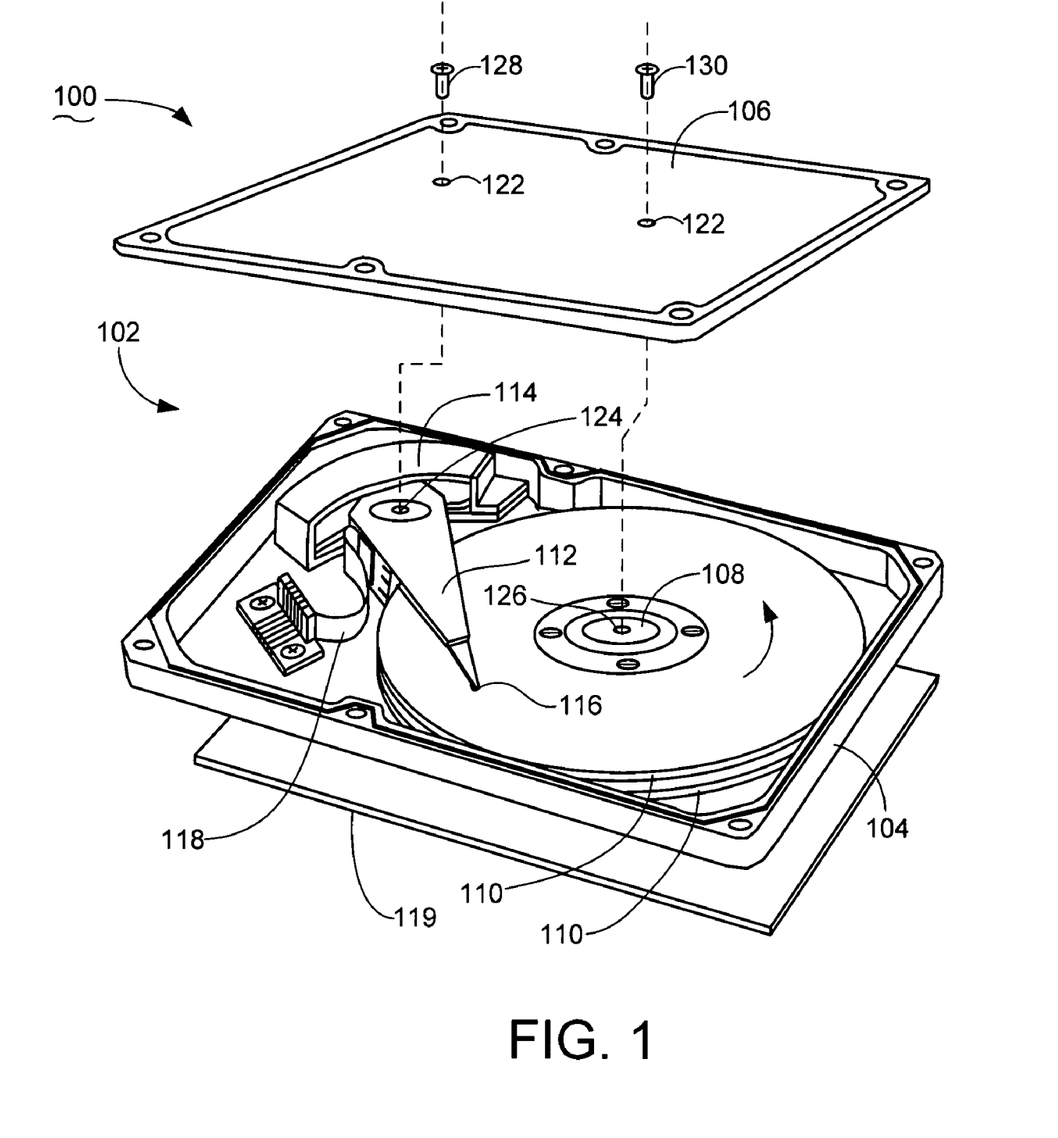
FIG. 1 is an exploded isometric view of an exemplary data storage device.

FIG. 1 depicts a data storage device 100 to show an exemplary application in which various embodiments of the present invention may be utilized. It will be understood, however, that the claimed invention is not limited to the exemplary embodiments disclosed herein.

The device 100 includes a housing 102 formed from a base deck 104 and top cover 106. An internally disposed spindle motor 108 is configured to rotate one or more storage media discs 110. A head stack assembly 1112, or actuator, rotates through application of current to a voice coil motor (VCM) 114. Controlled operation of the VCM 114 aligns an array of transducers 116 with tracks (not shown) defined on the media surface to store and retrieve data, respectively. A flex circuit 118 provides communication between the actuator 112 and a printed circuit board (PCB) 120.

The top cover 106 attaches to the base deck 104 to enclose the interior of the housing 104 by means of fasteners (not shown) about its periphery. The top cover 106 has a pair of apertures 122 that extend into the interior of the housing 102, one of the apertures 122 aligning with a threaded bore 124 in the actuator 112 and the other aperture 122 aligning with a threaded bore 126 in the spindle motor 108. A pair of threaded fasteners 128, 130 extends through the apertures 122 to engage the bores 124 and 126, respectively. Other fastener arrangements can readily be used as desired.

A fluid can be retained in the interior of the housing 102 once the top cover 106 has been secured to the base deck 104 and the fasteners 128 and 130 are inserted and tightened. The fluid can be air, a low density inert gas such as helium at a desired pressure, etc. It may be desirable to seal all possible leak locations, including the apertures 122, as these may have a tendency to leak even though filled with the fasteners 128, 130.

Figure 2:
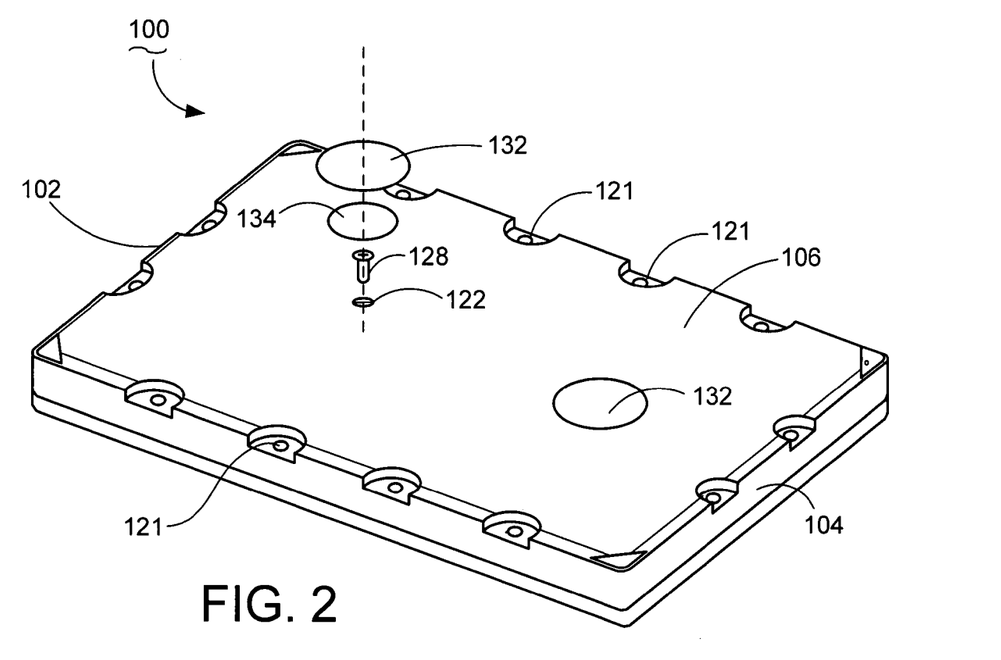
FIG. 2 is a view of the assembled device of FIG. 1 showing a thermoplastic seal and a work in process seal in exploded view above one of the openings in the housing thereof.

FIG. 2 shows the device 100 with the top cover 106 assembled to the base deck 104 and secured thereto via fasteners 121. A seal member 132 is bonded to the top surface of the cover 106 over the fastener 130. The seal member 132 is preferably characterized as a metal thermoplastic seal, or super seal, although other configurations can readily be used including non-metal substrates, thermoset adhesive, etc. For illustrative purposes, another metal thermoplastic seal 132 is depicted in exploded view above the aperture 122 and fastener 128.

An optional pair of work in progress (WIP) seals 134 are interposed between the seal members 132 and the top cover 106. The WIP seals 134 each have a pressure sensitive adhesive backing and are used as a temporary seal when it is desirable to charge the housing 102 with an inert gas atmosphere prior to placement of the thermoplastic seals 132. It will be appreciated that the seal members 132 can be alternatively used without the underlying WIP seals 134, as desired.

Figure 3:
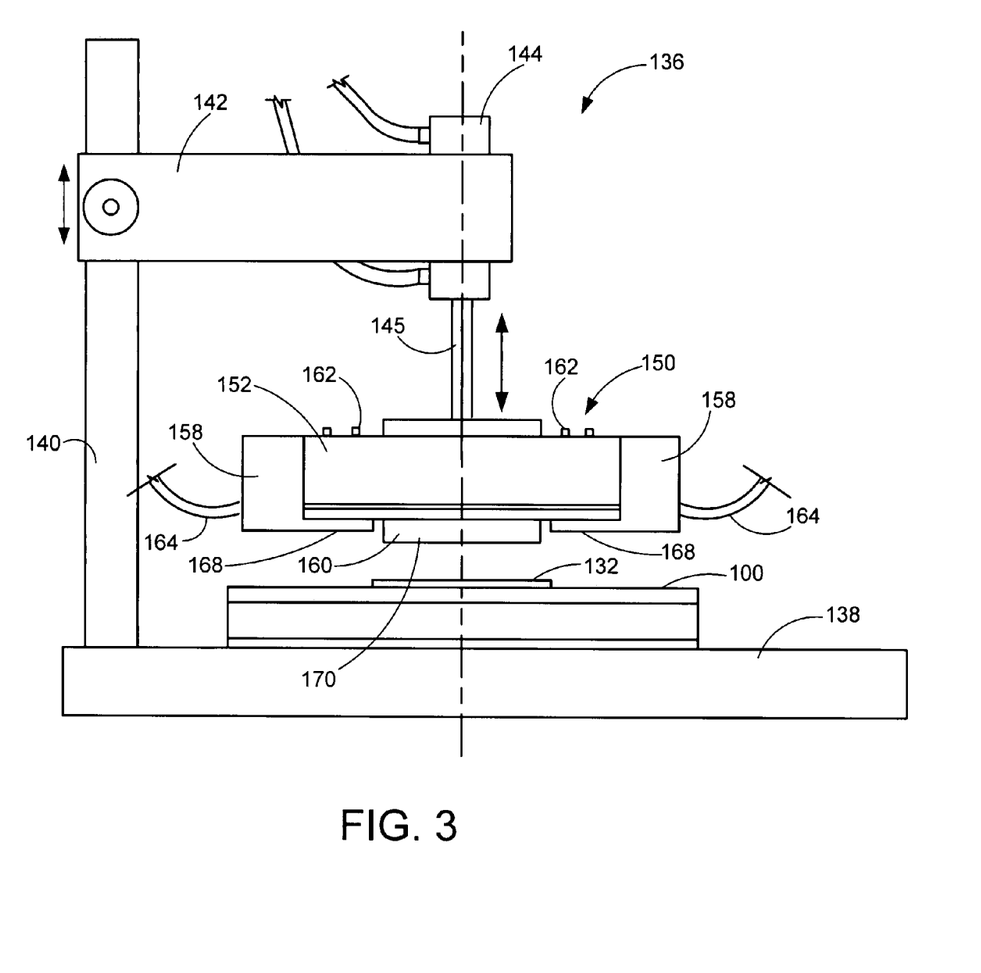
FIG. 3 is a side elevational, semi-detailed view of a thermoplastic seal bonding apparatus.

FIG. 3 shows a typical work place set up 136 to bond the thermoplastic seals 132 to the exterior surface of the housing 102 to seal apertures, such as 122, that communicate with the interior of the disc drive 100.

The setup 136 has a base 138 with an upwardly extending post 140 that supports a vertically adjustable holding arm 142. A pneumatic cylinder 144 is supported by the distal end of the holding arm 142. The device 100 is shown positioned on the base 138 with one of the thermoplastic seals 132 placed over one of the apertures 122.

A seal bonding apparatus 150 is connected to an extendible rod 145 of the pneumatic cylinder 144 by appropriate fasteners for suspension above the thermoplastic seal 132. The pneumatic cylinder 144 can be connected to a source of air pressure to selectively extend or retract the rod 145, and when extended, the seal bonding apparatus 150 can be moved to contact and exert a selected pressure on the thermoplastic seal 132 during bonding in a manner discussed below.

Figure 4:
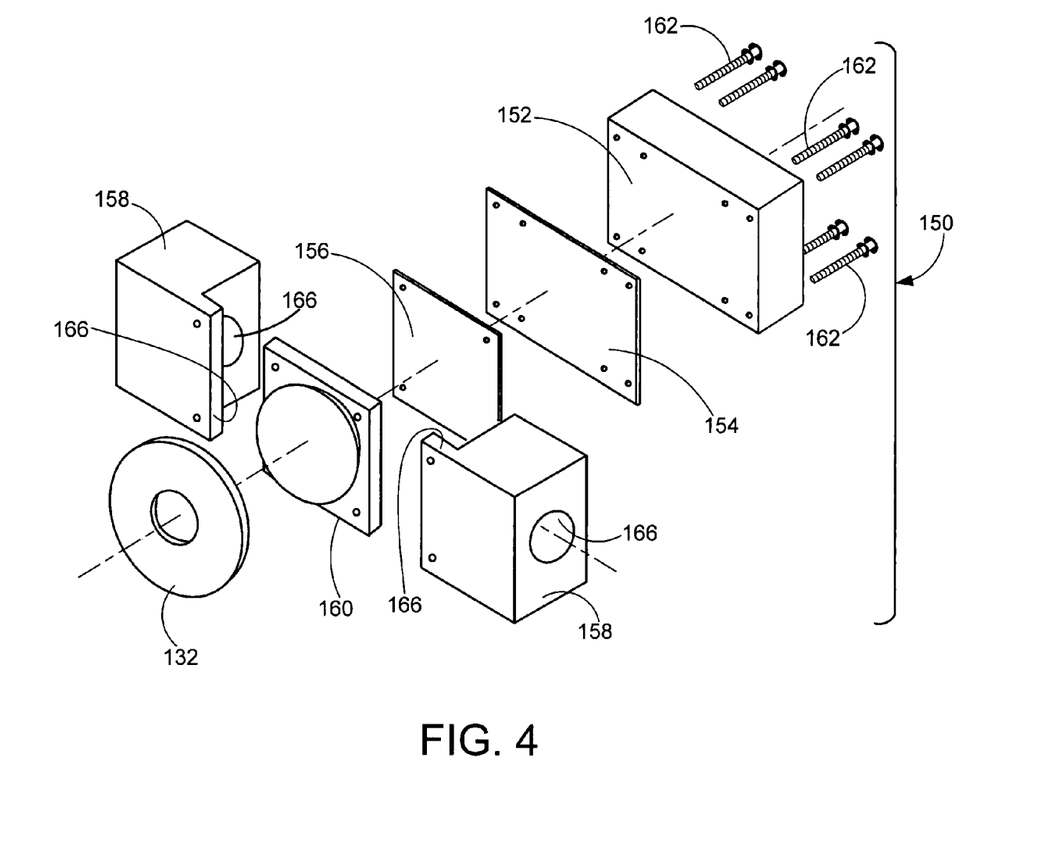
FIG. 4 is an exploded view of the components of the thermoplastic seal bonding apparatus of FIG. 3.

Turning now to FIG. 4 the seal bonding apparatus 150 will be described as having the following parts: an insulation block 152 to minimize the flow of thermal energy from flowing upward; a heater element 154; an electrical insulator 156 that prevents electric current in the heater element from flowing into a work piece; an opposing pair of cable lugs 158; and a heat spread conductor 160. Also depicted in FIG. 4 is one of the thermoplastic seals 132 in spatial proximity to the heat spread conductor 160. A plurality of cap screws 162 extend through appropriately disposed bores in the insulation block 152, and such cap screws 162 also extend through apertures in the heater element 154, the electrical insulator 156 and the heat spread conductor 160 to engage treaded bores in the cable lugs 158.

As shown in FIG. 3, a pair of electrical cables 164, connected to a power supply (not shown), extend into the bores 166 (FIG. 4) in the cable lugs 158 and connect to the heater element 154 for the passage of current thereby. In a preferred embodiment, the insulation block 152 is made of a suitable ceramic material. The heater element 154 can be made from 301 stainless steel shim stock with a thickness of between 2 to 20 mils and having an electrical resistance between 0.001 to 0.010 ohms; and the electrical insulator 156 is a 2 mil thick Kapton® layer. Kapton® is the registered trademark of E. I. DuPont de Nemours & Co. of Wilmington, Del., for polyimide film, a type of synthetic polymeric resin that is very durable, can handle very high temperatures and highly insulative with no, or negligible, outgassing. The electrical insulator 156 readily transfers the thermal energy from the heater element 154 to the heat spread conductor 160 because the Kapton® layer is relatively thin.

The electrical insulator 156 can alternatively be made from a thin layer of sapphire or ceramic. Sapphire and ceramic generally have a higher temperature tolerance than Kapton®, and sapphire further has an advantage of high thermal conductivity. It will be appreciated that a Kapton® based part would be relatively cheaper and easier to fabricate, ceramic would have a more intermediate cost, and sapphire would be the most expensive of these alternatives.

The cable lugs 166 and the heat spread conductor 160 (see FIG. 4) are preferably made from aluminum or copper. The cable lugs 158 are shaped to have extending tabs 168 (see FIG. 3) that serve to overlap and secure the heat spread conductor 160 in the assembled mode of the seal bonding apparatus 150 while permitting a seal contact portion 170 of sufficient protrusion dimension to contact and press against the thermoplastic seal 132 by extension of the pneumatic cylinder rod 145.

A thermoplastic seal, or super seal, of the type under consideration herein is preferably about an inch in diameter and is about 0.1 mil thick. Shapes can vary (including circular, wedge shaped, etc.), and the seal geometry will generally be defined by the width and thickness of the member once it is assembled.

In operation, the part of the seal bonding apparatus 152 that preferably contacts the thermoplastic seal is the heat spread conductor 160. While not limiting, it is advisable that the diameter of the seal contact portion 170 (FIG. 3) be slightly smaller in dimension than the diameter or span dimension of the thermoplastic seal 132 being applied, so the adhesive does not flow onto the seal contact portion 170 when heated and pressed by the seal bonding apparatus 150.

The power supply preferably delivers up to around 1000 amps at a low voltage (high voltage can be dangerous, so the operation is preferably limited to about 2 volts). The cables 164 are preferably large copper cables connecting the power supply to the relatively small heater element 154, and the current applied is that required to heat the thermoplastic seals in a reasonable amount of time, usually a few seconds, to assure that the adhesive of the thermoplastic seal reaches its melt temperature, preferably about 130-140 degrees Centigrade. A satisfactory power supply is the Uniflow2 power supply marketed by Miyachi Unitek Corporation, Monrovia, Calif.

As mentioned above, the seal bonding apparatus 150 is constructed to avoid the magnetic flux field generated by the high amperage current flow in the heater element 154, especially when used to seal an aperture in a data storage device, as it has been found that magnetic fields in the range of 10 to 100 Gauss can damage magnetic storage media. The reduction or elimination of the magnetic flux field of the electric current flowing through the heating element 154 can be achieved in several ways, which will now be described.

Figure 5:
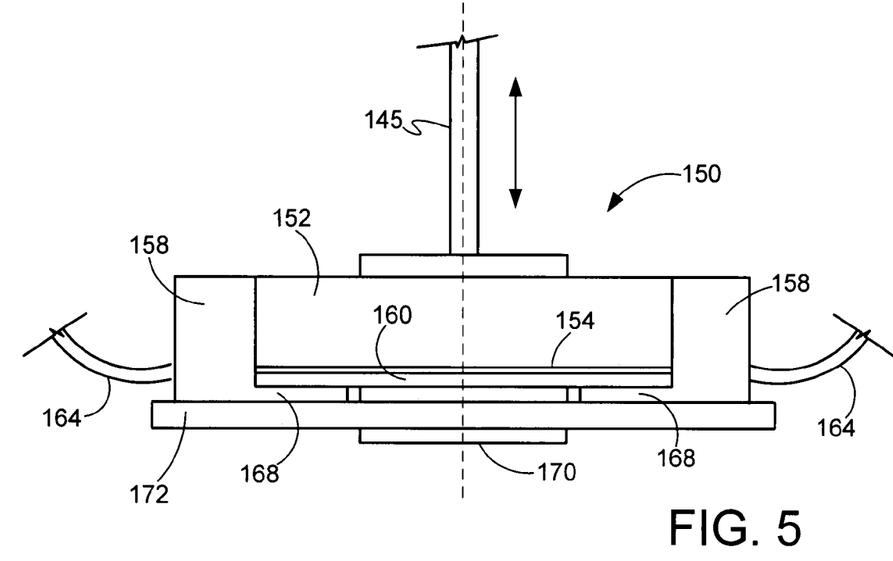
FIG. 5 is an elevational view of the thermoplastic seal bonding apparatus of FIGS. 3 and 4 that is configured to have a magnetic shield that substantially eliminates the magnet field effect.

One way is to provide the heating assembly 154 with a magnetic flux shield 172 as depicted in FIG. 5. The flux shield 172, formed of magnetic steel, has a central bore (not shown) through which the seal contact portion 170 of the heat spread conductor 160 extends as shown when the flux shield is attached to the bottom of the cable lugs 158, such as by fasteners (not shown). When the flux shield 172 is used, the protrusion dimension of the seal contact portion should be increased to extend sufficiently to contact the target thermoplastic seal 132 without interference by the flux shield 172.

Figure 6:
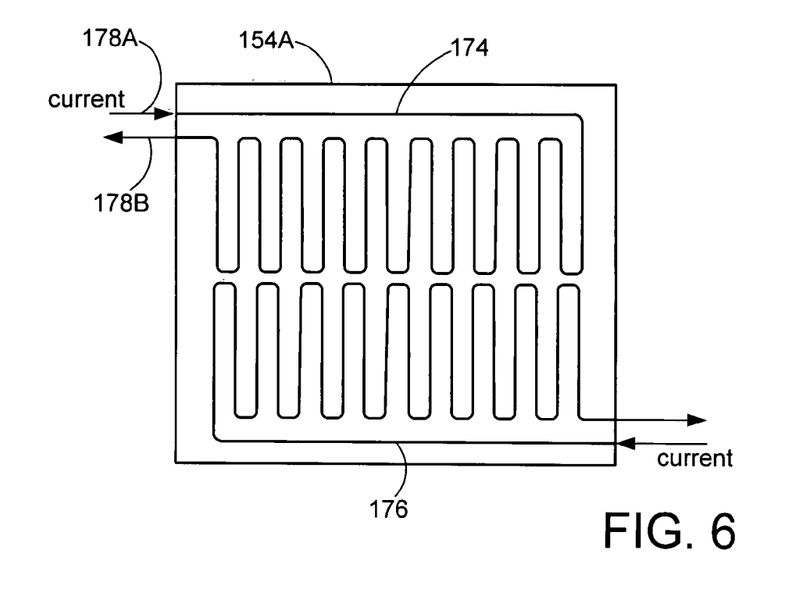
FIG. 6 is a diagrammatical representation of magnetically offsetting, serpentine heating coils for the heating element of the thermoplastic seal bonding apparatus of FIGS. 3 and 4.

In another embodiment, a heating element 154A is configured as shown in FIG. 6 to have a pair of serpentine heating elements 174 and 176 that form electrically conductive signal paths. A pair of electrical cables 178A and 178B connect the heating element 174 to the power supply, and another pair of electrical cables 180A and 180B connect the heating element 176 to the power supply. The serpentine layout of each of the heating elements 174, 176 causes the current to flow in opposite directions in neighboring conductor paths that can be phased to cancel the magnetic flux field of each other. As will be appreciated by one skilled in the art, the heating elements 174, 176 can be copper or other suitable metallic paths supported on a suitable heat resistant, electrical insulative substrate.

Figure 7:
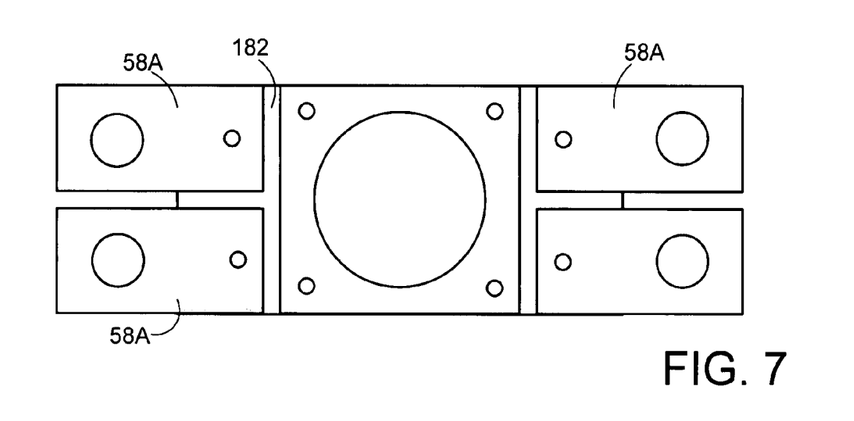
FIG. 7 is a bottom plan view of an alternate embodiment of the seal bonding apparatus.

FIG. 7 is a bottom plan view of an alternate embodiment of a seal bonding apparatus 150A that is similar to the seal bonding apparatus 150 but which represents another approach to neutralizing the magnetic flux generated by the heating element. This embodiment features a two part heating assembly 182, that is, parallel heating elements 182A and 182B (FIG. 7A and FIG. 7B, respectively), each of the heating elements 182A, 182B having end portions 184 interconnected by electrically conductive signal paths 186. The end portions 184 of each of the heating elements 182A, 182B are connected to its own pair of cable lugs 58A and its own pair of electrical cables (not shown).

Figure 7A:
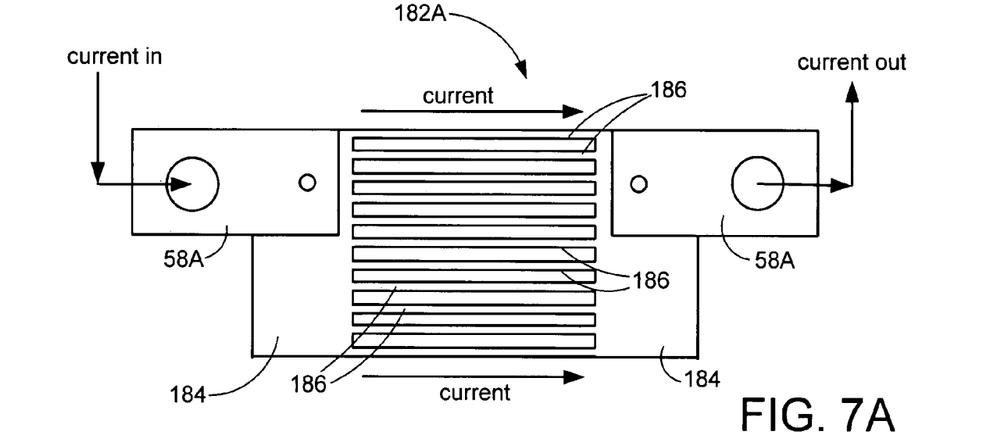
FIGS. 7A and 7B show the two part heating element thereof.
Figure 7B:
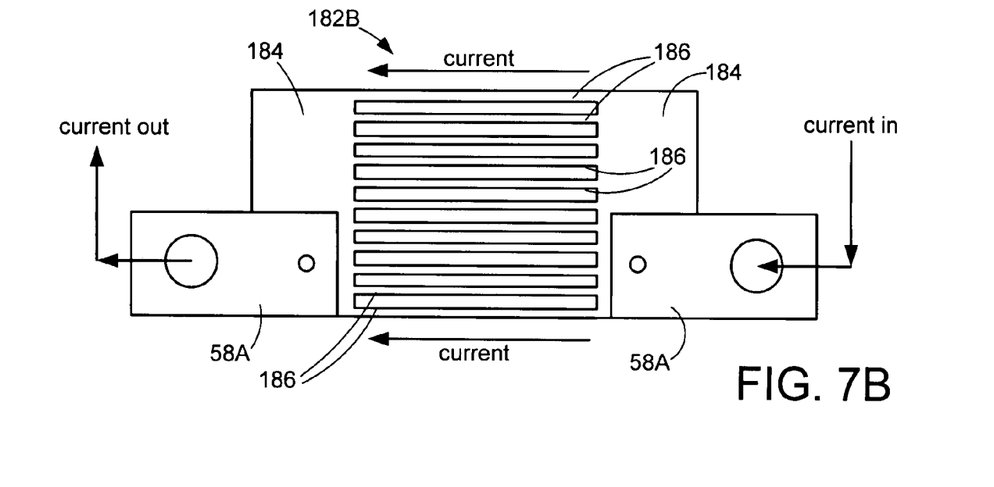

When the two heating elements 182A, 182B are juxtapositioned in close proximity, as depicted in FIG. 7, the current flows in opposite directions in the two heating elements 182A, 182B as indicated by the arrow indicia in FIGS. 7A, 7B, and these oppositely flowing currents in neighboring pairs of conductors tend to cancel the magnetic field that accompanies the generation of thermal energy by the heater elements. That is, the heating assembly 182 has a first set of electrically conductive signal paths (the heating element 182A) that accommodate the flow of a first electrical current in a first direction and a second set of electrically conductive signal paths (the heating element 182B) adjacent the first set (182A) that concurrently accommodate the flow of a second electrical current in a second direction opposite the first direction. The first and second sets of signal paths are thus positioned so that a first magnetic field generated by the first electrical current is substantially cancelled by a second magnetic field generated by the second electrical current.

When so positioned, a layer of Kapton® can be positioned between them as electrical insulation, or a layer of sapphire (a relatively good electrical insulator while having about one hundred times higher thermal conductivity than Kapton®) can be so situated.

Figure 8:
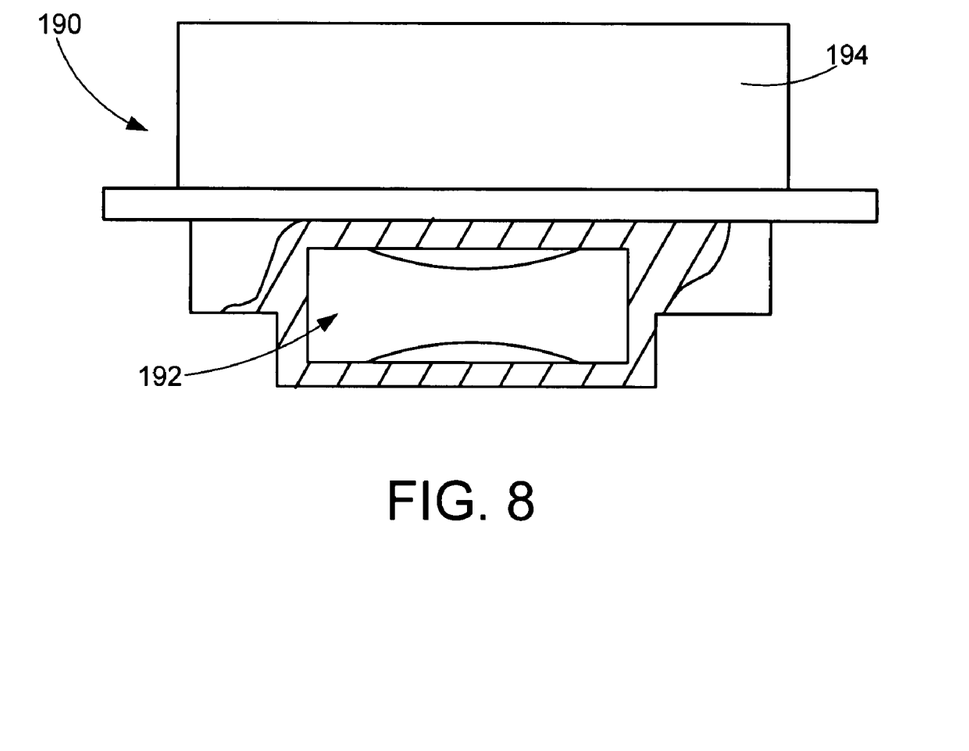
FIG. 8 is a partially cutaway, side elevational view of an alternate embodiment of the heat spreader of the thermoplastic seal bonding apparatus.
Figure 8A:
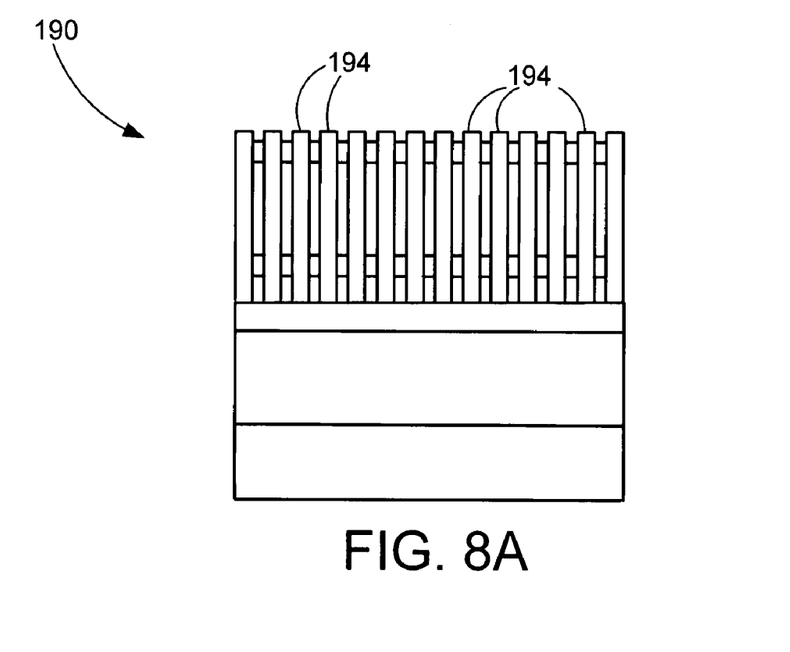
FIG. 8A is an elevational end view of the heat spreader of FIG. 8.

An alternate structure to the heat spread conductor 160 is a heat spread conductor 190 that is shown in FIGS. 8 and 8A. The heat spread conductor 190 has a vapor chamber 192 in which a small amount of water (or any suitable liquid having favorable phase behavior attributes) is disposed in the vapor chamber 192. Generally, the water evaporates on the upper wall of the chamber (closest to the heat source) and condenses on the lower wall (closest to the thermoplastic seal being heated). The liquid/vapor cycle reduces thermal resistance of the heat spread conductor 190 to practically nothing, having a greater benefit than that of making the heat spread conductor 190 of copper. Additionally, the heat spread conductor has a plurality of upstanding, air separated, fin members 194 on the heat side wall of the vapor chamber 192 as an assist to heat distribution and uniformity of thermal energy transfer.

A typical example of operating the seal bonding apparatus 150 with the Uniflow2 power supply to bond a thermoplastic seal 132 of the type and size indicated herein above is to run the power on a first mode at about 500 watts for about 7.5 seconds, and then reducing the power to a second mode of 125 watts; all parts of the seal reached the required 140° C. flow temperature of the seal adhesive after in 22 seconds. The temperature of the Kapton® and Teflon® parts did not exceed permissible temperature maximums (260° C. and 400° C., respectively). The flux shield 172 was found to reduce the maximum flux density to less than 10 Gauss at 1000 amps from more than 140 Gauss when not installed, showing that the flux density is reducible to acceptable levels when using the seal bonding apparatus 150 to seal openings in a disc drive housing.

Finally, it will be appreciated that the apparatus 150 can be readily adapted to incorporate any number of heating assemblies 154 as desired to apply thermal energy and pressure to one or more seal members in concurrent or sequential fashion.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the claims.

What is claimed is:

1. An apparatus comprising:
    a heating assembly to which electrical current is applied to generate thermal energy; and
    a heat conductor configured to transfer the generated thermal energy to a thermally attachable seal member adjacent a housing, wherein the heating assembly is configured with a flux shield member that surrounds the heat conductor to substantially prevent magnetic flux generated by the applied electrical current from extending to the housing.

2. The apparatus of claim 1, further comprising pressure means for applying a predetermined pressure upon the heating assembly and the conductor to bias the conductor against the seal member during the application of the generated thermal energy thereto.

3. The apparatus of claim 2, further comprising a thermal insulator disposed between the pressure means and the heating assembly to substantially prevent the thermal energy from extending to the pressure means.

4. The apparatus of claim 1, further comprising an electrical insulator disposed between the heating assembly and the seal member to substantially prevent the applied electrical current from extending to the housing as the seal member is adhered thereto.

5. The apparatus of claim 1, wherein the heating assembly comprises a first set of electrically conductive signal paths that accommodates the flow of a first electrical current in a first direction and a second set of electrically conductive signal paths adjacent the first set that concurrently accommodates the flow of a second electrical current in a second direction opposite the first direction, wherein the second set is interlaced with the first set so that a first magnetic field generated by the first electrical current is substantially cancelled by a second magnetic field generated by the second electrical current.

6. The apparatus of claim 1, wherein the flux shield member comprises a magnetic steel material which responds to magnetization and provides a magnetic shield between remaining portions of the heating assembly and the housing.

7. The apparatus of claim 1, wherein the heat conductor extends beyond the flux shield member through a central bore in the flux shield member.

8. The apparatus of claim 1, wherein the heating assembly is characterized as a first assembly, and wherein the apparatus further comprises a second heating assembly to which second electrical current is applied to generate thermal energy, wherein the second heating assembly is further configured to substantially prevent a magnetic field generated by the applied second electrical current from extending to the housing.

9. The apparatus of claim 1, wherein the housing is configured to retain a low density gas and wherein the seal member hermetically seals an aperture that extends through the housing.

10. An apparatus comprising:
    a thermal energy conductor configured to transfer generated thermal energy from a heating assembly to a sealing member to form a seal between the sealing member and a housing; and
    a flux shield member adjacent the thermal energy conductor to substantially prevent any magnetic flux generated by electrical current applied to the heating assembly from extending to the housing.

11. The apparatus of claim 10, further comprising a first set of electrically conductive signal paths that accommodates the flow of a first electrical current in a first direction and a second set of electrically conductive signal paths adjacent the first set that concurrently accommodates the flow of a second electrical current in a second direction opposite the first direction, wherein the second set is interlaced with the first set so that a first magnetic field generated by the first electrical current is substantially cancelled by a second magnetic field generated by the second electrical current.

12. The apparatus of claim 10, wherein the flux shield member is formed of a magnetic steel which responds to magnetization and provides a magnetic shield between the heating assembly and the housing.

13. A method comprising:
applying electrical current to a heating assembly to generate thermal energy; and
transferring the generated thermal energy by a heat conductor to a seal member to form a seal between the sealing member and a housing while using a flux shield member that surrounds the heat conductor to substantially prevent any magnetic flux generated by the applied electrical current from extending to the housing.

14. The method of claim 13, wherein the transferring step comprises using an electrical insulator disposed between the conductor and the seal member to substantially prevent the applied electrical current from extending to the housing.

15. The method of claim 13, further comprising supplying a predetermined pressure upon the conductor to bias the conductor against the seal member during the applying and transferring steps.

16. The method of claim 13, wherein the heating assembly comprises a first set of electrically conductive signal paths that accommodates the flow of a first electrical current in a first direction and a second set of electrically conductive signal paths adjacent the first set that concurrently accommodates the flow of a second electrical current in a second direction opposite the first direction, wherein the second set is interlaced with the first set so that a first magnetic field generated by the first electrical current is substantially cancelled by a second magnetic field generated by the second electrical current.

17. The method of claim 13, wherein the flux shield member provides a magnetic shield between remaining portions of the heating assembly and the housing.

18. The method of claim 13, wherein the housing is characterized as a housing of a data storage device in which a magnetic storage medium is disposed.

19. The method of claim 13, wherein the housing is configured to retain a low density gas and wherein the sealing member hermetically seals an aperture that extends through the housing wall.

20. The method of claim 13, wherein the seal member comprises a substrate and a layer of thermoplastic adhesive adjacent the substrate.

* * * * *